Figure 1:
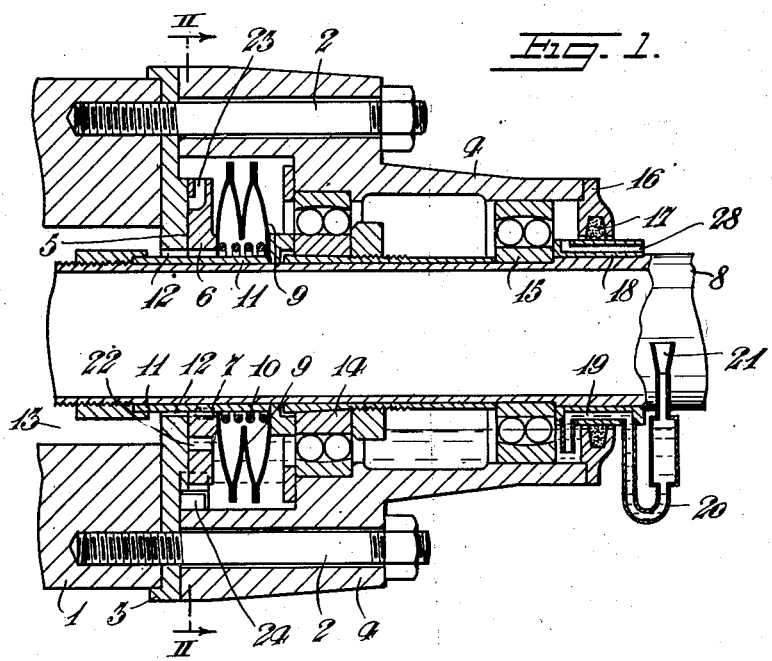

April 28, 1936.  C. ROSENBLAD  2,038,855

DRYING CYLINDER MACHINE

Filed April 25, 1933  3 Sheets-Sheet 1

Inventor:
Curt Rosenblad
By Sommers & Young
Attys.

April 28, 1936. C. ROSENBLAD 2,038,855
DRYING CYLINDER MACHINE
Filed April 25, 1933 3 Sheets-Sheet 2

Inventor
Curt Rosenblad
By Sommers & Young
Attys.

April 28, 1936.  C. ROSENBLAD  2,038,855
DRYING CYLINDER MACHINE
Filed April 25, 1933   3 Sheets-Sheet 3
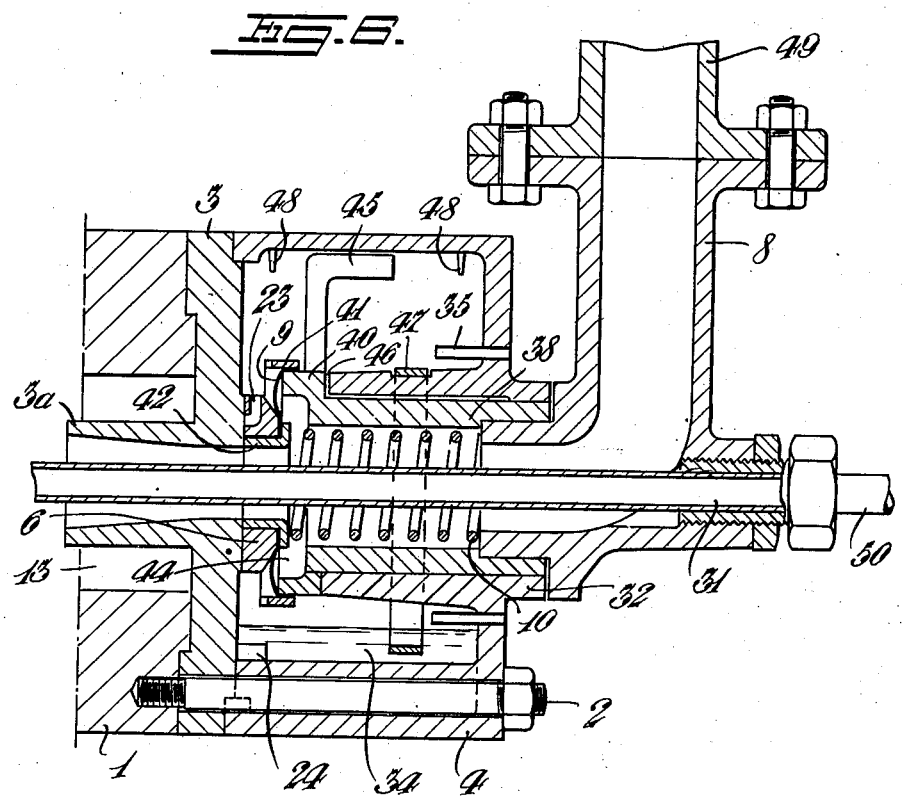
Inventor
Curt Rosenblad.
By Sommers y Young
Attys.

Patented Apr. 28, 1936

2,038,855

UNITED STATES PATENT OFFICE 2,038,855

DRYING CYLINDER MACHINE

Curt Rosenblad, Sodertalje, Sweden

Application April 25, 1933, Serial No. 667,875
In Norway May 3, 1932

19 Claims. (Cl. 285—10)

This invention relates to drying cylinder machines, such as are used for drying webs of cellulose, paper and the like, and is more particularly directed to means for effecting a steam-tight seal between the rotatable drying cylinder and the stationary pipe for supplying steam to said cylinder.

Many sealing devices have been proposed and also tried for this purpose, but they have all turned out to be unsatisfactory after some time, when the sealing surface and the bearings for the cylinder have got somewhat worn, so that the centre lines of the rotatable cylinder and the stationary supply pipe do not longer exactly coincide. Because the machines are continuously running day and night on all work days, the time-consuming repairs of the worn boxes must be carried out on holidays as a very expensive overtime job.

It was recently proposed to use boxes having a spherical and a plane sealing surface and between them a sealing ring ground to seal against said sealing surfaces, which are pressed against the ring by external springs. Said construction suffers, however, from the serious drawback that the pressure on the sealing surfaces is many times higher than that necessary for sealing at the prevailing pressure in the cylinder, because the box shall also absorb the stresses in the external pipes. Nevertheless, the spherical surface permits the siphon tube to be tilted when there are stresses in the external pipes, and thus the draining of the condensate will be impaired.

The chief object of this invention is to simplify and to improve such sealing devices and to provide for a sealing device which will effect a good sealing between the stationary steam supply pipe and the rotatable drying cylinder, even if the sealing surface is somewhat worn and the centre lines of the cylinder and the supply pipe do not exactly coincide.

Another object of the invention is to provide for an effective lubrication of the single sealing surface so as to increase the sealing effect.

Another object of my invention is to cause the sealing surfaces to engage each other with a pressure varying as the difference of pressure between the two spaces on both sides of the seal.

Another object of my invention is to maintain the box tube and the siphon tube exactly centered both axially and radially independent of all external stresses and strains, while simultaneously the sealing is effected with the minimum pressure just necessary for the purpose. In other words, an object of my invention is to combine a good axial and radial centering of the siphon tube, i. e. an efficient draining action, with a minimum wear of the sealing surface, i. e. a long uninterrupted and undisturbed service and a long life-time of the working parts without any repairs. The sealing is effected by means of one single pair of plane sealing surfaces engaging each other, and on said surfaces no external stresses from the piping, i. e. from the supply and draining tubes, can act.

Other objects of the invention will be evident from the following specification and claims.

Some embodiments of the invention are shown in the annexed drawings.

Figure 2:
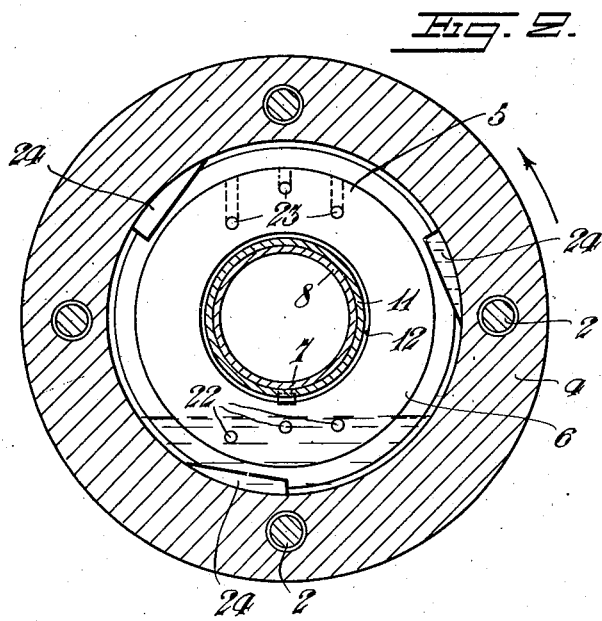
Figure 3:
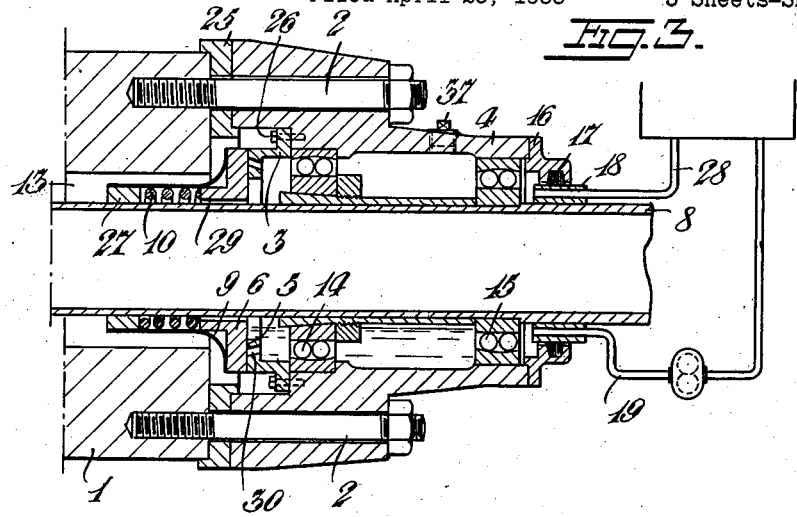
Figure 4:
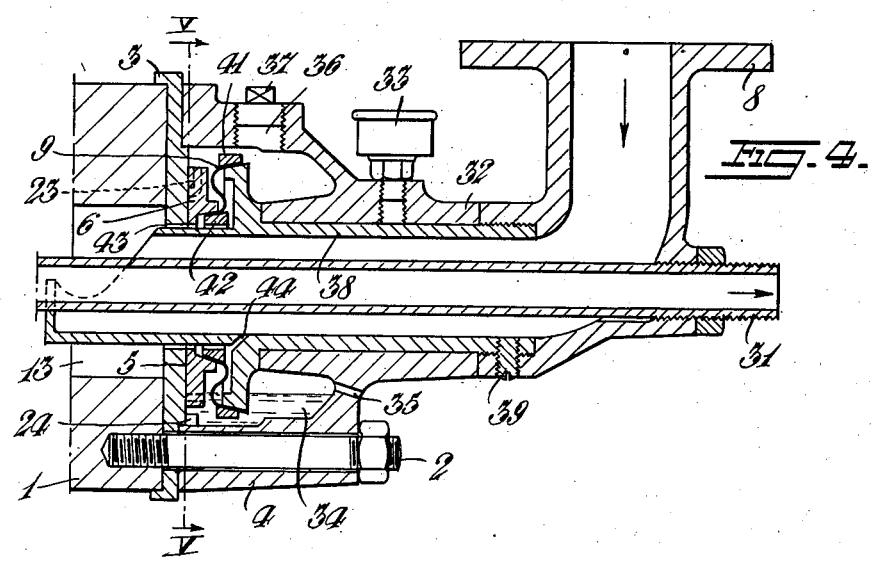
Figure 5:
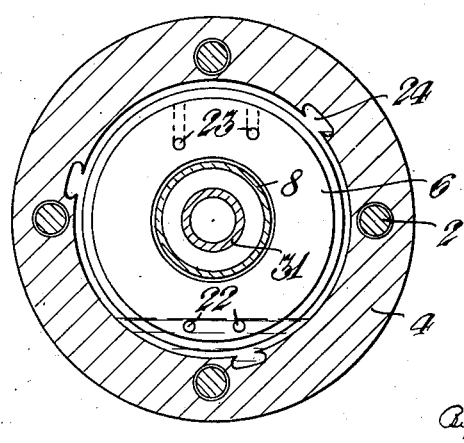

Fig. 1 shows a vertical, axial section through the steam admission journal of a cylinder in a cylinder drying machine having a sealing device in accordance with this invention. Fig. 2 is a vertical section on the line II—II in Fig. 1. Fig. 3 is an axial, vertical section through a modified embodiment. Fig. 4 shows another modification. Fig. 5 shows a modified detail. Fig. 6 is an axial vertical section through still another modification.

Referring now to Figs. 1 and 2 of the drawings 1 indicates the hollow rotary journal of a drying cylinder of the conventional design. By means of the studbolts 2 a base plate or sealing ring 3 and a casing 4 for the bearings are fixed to the journal 1. Consequently, the ring 3 rotates but is not movable in the axial direction. The casing 4 is, preferably, made in one integral piece. The sealing ring 3 is plane and carefully finished (ground) on its plane end surface 5, opposite to the journal 1 and with this surface engages a plane surface of a rotary sealing ring 6, said surface 5 constituting the sealing surface proper. The sealing ring 6 is prevented from rotating by one or more axial guides 7, said guides being fixed on the stationary box pipe 8 through which steam is admitted to the interior of the drying cylinder. The ring 6 is movable in the axial direction and also, but only slightly, in the radial direction and yieldingly connected with the box pipe 8 by means of two double diaphragms 9, preferably made of sheet metal, and is pressed against the sealing element 3 by the helical spring 10 abutting against a shoulder on a sleeve 11 fixed on the box pipe 8. The two internal chambers of the diaphragm 9 are absolutely gas-tight and are also connected by gas-tight connections on one side to the sealing ring 6 and on the other side to the sleeve 11 rigidly attached to the box pipe 8. These two chambers communicate with the chamber 13 in the hollow journal 1 by an annular channel 12 around the outer periphery of the sleeve 11. The steam pressure above atmospheric prevailing in this internal chamber 13 (and consequently also in the interior of the drying cylinder) will thus also prevail within the double diaphragms 9 and is added to the pressure of the spring 10 to press the engaging surfaces 5 of the sealing elements or rings 3 and 6 against each other. A higher steam pressure evidently requires a higher pressure of one sealing surface against the other to give a sufficient sealing effect and this is here automatically brought about at the engaging surfaces 5 inasmuch as the steam pressure within the diaphragm 9 gives the pressure on said surfaces 5 the correct value for attaining a good sealing in any moment (at any steam pressure). At the same time the great advantage is attained that the pressure on said surfaces 5 is never too high with regard to the steam pressure just prevailing, the wear on them being consequently as low as possible.

The guides 7 mentioned above prevent all torsional stresses from being transferred to the diaphragms.

In the casing 4 two ball bearings 14 and 15 are provided to guide and centre both axially and radially the box pipe 8 and the siphon pipe (not shown) secured thereto, ball bearings being able to absorb both axial and radial stresses. Thus, said pipes and consequently also the sleeve 11 cannot move either axially or radially and no axial or radial forces due to the displacement thereof can be transmitted to the ring 6 and the sealing surface 5. The sealing action is, therefore, quite independent of external stresses and forces. The bearings 14, 15 prevent the box pipe 8 and the siphon pipe from being tilted. The inner rings of these bearings are secured to the pipe 8 and the outer rings to the inside of the casing 4 which is closed by an oil-tight cover 16, a packing ring 17 of the usual design being provided in a slot in the cover 16 to engage a sleeve 18 rigidly secured to the box pipe 8. The casing is filled with oil to a suitable level for lubricating the ball bearings 14, 15 and the sealing surface 5. The stationary sleeve 18 has a channel 19 in its lowermost portion, communicating with a U-shaped glass tube 20 outside of the casing 4. This tube 20 forms an oil level indicator for facilitating the control of the oil level in the casing. Fresh oil may be poured in through the funnel 21. To cause the oil to lubricate also the sealing surface 5 a number of axial channels 22 are bored in the lower portion of the sealing ring 6 and in the upper portion thereof some bent channels 23 are formed, all of said channels 22, 23 discharging at the sealing surface. To supply a sufficient quantity of oil to the upper channels 23 even if the oil level in the casing 4 is low and the rotation is slow, a slow speed of rotation being generally used in drying cylinder machines, a number of buckets or scoops 24 are provided on the inner periphery of the rotating casing 4 just opposite the ring 6. These buckets catch the oil at the bottom of the casing during their rotation and pour it into the vertical parts of the channels 23 on the uppermost portion of the ring 6.

Through the stationary ring 18 a channel 28 is bored to create a direct communication from the interior of the casing 4 to the atmosphere. If steam bubbles escape through the hole 28 they indicate that the sealing is faulty. This hole is further necessary for preventing a pressure above atmospheric in the casing 4. Such pressure could, of course, raise the level of the oil in the gauge 21, even if there was no oil in the chamber 4.

It is obvious that the sealing ring 6 is free to adjust itself to engage the ring 3 tightly and with a substantially uniform pressure all over, even if the journal 1 and the box pipe 8 are not exactly coaxial. The sealing device will, therefore, function satisfactorily, even if the bearing for the journal 1 is worn. If the sealing surfaces are worn, this matter of fact evidently does not reduce the sealing effect.

In the modified embodiment shown in Fig. 3 the oil-tight casing 4 is fixed to the journal 1 of the rotary drying cylinder by the bolts 2, an annular washer 25 being placed between the casing and the journal, while the sealing ring 3 not movable in the axial direction is secured to the casing 4 by means of screws 26 or the like and thus rotates with said casing. On the box pipe 8, which serves to admit the steam to the rotating drying cylinder, a sleeve or ring 27 is secured and to the outer periphery of this sleeve one end of the funnel-shaped diaphragm 9 is attached with a gas-tight joint. By means of a gas-tight connection the other end of said diaphragm is secured to the non-rotary sealing ring 6 which is movable in the axial direction and also to some extent in the radial direction. Within the diaphragm 9 between the stationary sleeve 27 and the sealing ring 6 the helical spring 10 is arranged in the same manner as in the embodiment shown in Figs. 1 and 2. Also in this embodiment the diaphragm 9 permits the ring 6 to move only slightly radially, and, thus, serves to keep it in its proper place in the radial direction.

In this case the internal chamber of the diaphragm 9 is not under the pressure prevailing in the chamber 13 of the hollow journal but is partially filled with oil, which flows in from the casing 4 through the channel 29. On the contrary, the steam pressure in the chamber 13 of the journal 1 acts upon the outer surface of the diaphragm 9, said pressure being equal to that prevailing within the drying cylinder. This pressure on the outer surface of the diaphragm 9 presses the sealing ring 3 against the sealing ring 6 at the surface 5 with a pressure variable in accordance with the steam pressure, just as set forth above for the embodiment shown in Figs. 1 and 2. Channels 30 are bored obliquely through the ring 6 for conducting the lubricating oil to the sealing surface 5. The other parts are identical with the corresponding parts of the embodiment shown in Figs. 1 and 2 and carry the same reference characters.

An oil channel is provided normally closed by a screw plug 37 or the like. In case of emergency oil may be supplied through said channel.

Normally oil is supplied from a central tank or pump common to all or some of the steam inlet boxes to the cylinders of a drying cylinder machine, for instance, a paper machine, to the pipe 28 and is circulated through the casing 4. Then the oil is drawn off through the pipe 19 and returned to said common tank or pump. Thus, an efficient lubrication is secured.

Such system of circulation may be used also in the embodiment shown in Fig. 1.

It is to be observed that also in the embodiment shown in Figs. 1 and 2 the helical spring 10 may be arranged in such manner that it becomes protected by the oil in the casing 4. To bring about this, the spring 10 shall be made with such a great diameter that it will be quite outside of the diaphragms 9 and surround them. For the same purpose a number of smaller springs may be substituted for the spring 10, said smaller springs being then uniformly distributed around the outer periphery of the diaphragms.

In the embodiment shown in Fig. 4 the usual siphon pipe 31 for draining the cylinder is shown in the centre of the steam supply pipe 8 leading from the steam box to the cylinder. (Such siphon pipes are, of course, also used in the embodiment shown in Figs. 1–3, though not shown in the drawings for the sake of clearness). For the ball bearings an ordinary sliding bearing 32 is substituted which is lubricated by oil supplied through an oil cup 33 and formed in one integral piece with the casing 4. The oil-chamber 34 of the said casing communicates with the outer air by a narrow channel 35, whose inner opening in the chamber 34 is above the level of the oil in said chamber. The oil is filled into said chamber through a channel 36, normally closed by a screw plug 37.

On the box pipe 8 a cylindric sleeve 38 is screwed and fixed by a set screw 39. The cylindric sleeve 38 fits snugly in the bearing 32 and is guided by the same. Thus, the siphon pipe 31 screwed into the box pipe 8 cannot be tilted by stresses in the external pipes (connected with pipes 8 and 31) but is maintained centered exactly both axially and radially in relation to the cylinder journal 1.

The sleeve 38 is provided with a flange 40 carrying the diaphragm 9. The outer surface of the sleeve 38 is slightly conical and to it the outer rim of the diaphragm 9 is clamped by means of a conical ring 41 pressed thereon. The inner edge or rim of said diaphragm 9 is clamped between the wall of a conical hole of the ring 6 movable in the axial direction and a conical ring 42 inserted into it.

The space between the flange 40 and the diaphragm 9 communicates with the space 13 of the hollow journal 1 via a channel 43 and also via an aperture 44 in the box pipe 8. In other respects the device shown is similar to that shown in Fig. 1 and the corresponding parts carry the same reference characters. In the embodiment shown in Fig. 4 the helical spring is dispensed with, because the diaphragm 9 has such a shape that it gives the additional axial pressure on the sealing surface 5. The shape and arrangement of the diaphragm are also in this embodiment chosen so as to cause said diaphragm to prevent the ring 6 from being displaced radially to any considerable extent.

If, for any reason, steam escapes into the oil chamber 34, this steam will escape through the channel 35 forming bubbles. Such bubbles indicate a fault and show that a repair is necessary. Thus, the channel 35 serves to indicate if the sealing device functions properly or not. If steam escapes into the chamber 34, this channel 35 also prevents said steam from penetrating into the bearing 32.

Fig. 5 shows a modified embodiment of the scoops 24 shown in Figs. 1 and 2. In accordance with Fig. 5 said scoops 24 are formed in the wall of the casing 4 proper and have a shape so as to function well for both directions of rotation as illustrated.

In the embodiment shown in Fig. 6 the oil of the chamber 34 serves to lubricate the bearing 32 by means of oil grooves 46. The clamping ring 39 serving to clamp the inner edge of the diaphragm 9 to the sealing ring 6 is shaped as a throttled passage for the steam channel through the tube 8 to the interior of the journal 1 and is continued by a diffusor-shaped portion 3a of the sealing ring 3. Said part 3a projects into the chamber 13 of the journal 1, as shown.

There are four or more pipes 35 and the oil is injected through one of said pipes by means of a syringe for lubricating, when the machine is standing still. On the stationary flange 40 a scraper 45 is secured which serves to scrape the oil from the walls of chamber 34 to lead it down to the groove 46. A revolving oil dip ring 47 is also provided guided by a recess in the bearing 32. Furthermore, there are pins or spikes 48 secured to the wall of the chamber 48. The oil following the walls of the chamber 34, when the latter is rotated, will be accumulated on said spikes and drip down on the sealing surface and the bearing.

The scoops 24 and the spikes 48 will be most efficient at low speeds, while the ring 47 and the scraper 45 will be efficient at all speeds of the cylinder.

In other respects this embodiment is similar to those shown in Figs. 1–5 and corresponding parts carry the same reference characters.

The steam admitted through the box pipe 8 passes through the ring 39 and is throttled by the same to cause a drop of pressure, which is afterwards recovered in the diffusor 3a. Said drop of pressure will cause the steam pressure pressing the sealing ring 6 towards the ring 3 to be higher than the steam pressure tending to press said two rings 3, 6 apart, if steam leaks out between said rings. Thus, an efficient sealing is attained under all circumstances. The diaphragm 9 is constructed to keep the ring 6 from being displaced radially to any considerable extent and the bearing 32 prevents the box pipe 8 and the steam pipe 50 from being displaced whether axially or radially in relation to the journal 1.

An auxiliary helical spring 10 may be used to press said rings 3, 6 against each other, as shown, though generally said spring may be omitted.

A throttling ring similar to that shown in Fig. 6 may also be used in the embodiment shown in Fig. 4. Generally, the sealing surfaces and the diaphragm should be dimensioned in such manner that the force tending to press the sealing surfaces against each other will under all circumstances be higher or greater than that force which tends to push the sealing surfaces apart, when steam leaks out.

Other modifications may be also made in the embodiments shown and described without leaving the spirit of the invention. Thus the sealing ring 3 not movable in the axial direction may be connected with either the rotary or the non-rotary parts, as desired, while the other ring 6 slidable in the axial direction is connected with the other of said parts. The order of the sealing rings counted from the chamber 13 is arbitrary. The sealing ring 3 immovable in the axial direction may, of course, be integral with the part (1 or 4), which it is connected with. The elastic connection between the adjustable sealing ring 6 and the part (4 or 1), to which it is connected, may consist of an elastic tube or pipe connection or a diaphragm connection or a combination of both, with or without additional springs like 10. Scoops of the type shown at 24 in Figs. 1 and 2 may also be provided in the embodiment shown in Fig. 3.

What I claim is:—

1. In a drying cylinder machine having hollow journals surrounding stationary box pipes for supplying steam to said cylinders, in combination for each rotary cylinder, one single pair of annular sealing members, said members having one single pair of plane sealing surfaces disposed substantially at right angles to the axis of rotation and engaging each other, connections between said sealing members and said journal and said box pipe, one of said connections being rigid and the other consisting of an elastic tubular connection adapted to permit the corresponding sealing member to adjust itself to the movement of the sealing surface in all directions, one or more bearings enclosing each box pipe to keep it centered both axially and radially independent of external stresses, and means for applying the full steam pressure prevailing in said cylinder on said tubular connection to increase the pressure on said sealing surfaces in dependence of said steam pressure.

2. In a drying cylinder machine a plurality of rotary drying cylinders for a web running thereon, each cylinder having a hollow journal, in combination for each rotary cylinder, a stationary box pipe for supplying steam to the cylinder, one single pair of annular sealing members, said members having one single pair of plane sealing surfaces engaging each other substantially at right angles to the axis of rotation, connections between said sealing members and said journal and said box pipe, one of said connections being rigid and the other consisting of an elastic gas-tight diaphragm joint adapted to permit the corresponding sealing member to adjust itself to the movements of the sealing surface in all directions, the interior of said cylinder being in direct and open communication with said diaphragm so that the pressure on said sealing surfaces varies as the steam pressure in said cylinder, a siphon pipe secured to said box pipe, external pipes connected with said box pipe and said siphon pipe, and one or more bearings secured to said journal and enclosing said box pipe to absorb all axial and radial stresses from said external pipes.

3. In a machine for producing cellulose webs, having a number of drying rotary cylinders, in combination for each rotary cylinder, a box pipe for supplying steam from an external steam pipe to the cylinder, a hollow journal on said cylinder communicating with said box pipe, a siphon pipe extending through said hollow journal into said cylinder to drain the same, said siphon pipe being secured to said box pipe, an external outlet pipe connected with said siphon pipe, only two annular sealing members, said sealing members having one single pair of plane annular sealing surfaces engaging each other substantially at right angles to the axis of rotation, connections between said sealing members and said journal and said box pipe, one of said connections being rigid to make the corresponding sealing member immovable in the direction of said axis of rotation and the other of said connections consisting of an elastic tubular connection adapted to make the corresponding sealing member adjustable in all directions, the interior of said cylinder being in communication with said diaphragm to vary the pressure on said sealing surfaces in free dependence on the steam pressure in said cylinder, a number of springs between said adjustable sealing member and a fixed point on said box pipe to increase the pressure on said sealing surface, and at least one bearing secured to said journal to support and fix said box pipe both axially and radially without tilting.

4. In a drying cylinder machine having hollow journals surrounding stationary box pipes for supplying steam to said cylinders, in combination for each rotary cylinder, only two annular sealing members, having one single pair of plane annular sealing surfaces engaging each other substantially at right angles to the axis of rotation, connections between one of said sealing members and said journal and between the other sealing member and said box pipe, one of said connections being rigid to make the corresponding sealing member immovable in the direction of said axis of rotation and the other of said connections consisting of an elastic tubular connection adapted to make the corresponding sealing member adjustable in all directions, one or more bearings secured to said journal to prevent said box pipe from being displaced whether axially or radially and from being tilted, and means for applying the full steam pressure prevailing in said cylinder on said tubular connection to increase the pressure on said sealing surfaces in strict dependence on said steam pressure, said tubular connection being so dimensioned in relation to said sealing surfaces that the pressure tending to press said surfaces against each other is greater than the pressure tending to press them apart, if steam leaks out between them.

5. In a machine having drying cylinders, in combination for at least one rotary cylinder, a hollow journal on each cylinder, a stationary box pipe to each journal, a steam supply pipe to said box pipe, one single pair of sealing rings having only two plane sealing surfaces engaging each other substantially at right angles to the axis of rotation, connections between one of said sealing rings and said journal and between the other sealing ring and said box pipe, one of said connections being rigid and the other consisting of an elastic gas-tight diaphragm adapted to permit the corresponding sealing ring to adjust itself to the movement of the sealing surfaces in all directions, said diaphragm being in substantially unthrottled communication with said cylinder to cause the pressure of said sealing surfaces against each other to vary as a function of the steam pressure in said cylinder, at least one bearing secured to said journal to keep said box pipe in its place both axially and radially, and a throttle disk connected with one of said sealing rings.

6. In a machine having drying cylinders, in combination for each rotary cylinder, a hollow journal on each cylinder, a stationary box pipe to each journal, a steam supply pipe to said box pipe, sealing rings, on said rings substantially at right angles to the axis of rotation plane sealing surfaces engaging each other, connections between said sealing rings and said journal and said box pipe, one of said connections being rigid and the other consisting of an elastic gas-tight diaphragm adapted to permit the corresponding sealing ring to adjust itself to the movement of the sealing surface in all directions, at least one bearing secured to said journal to guide said box pipe, a throttle disk connected with one of said sealing rings, and a diffusor connected with the other of said sealing rings.

7. In a drying cylinder machine having hollow journals surrounding stationary box pipes for applying steam to said cylinders, in combination for each rotary cylinder, one single pair of annular sealing members having a single pair of plane annular sealing surfaces engaging each other, on said sealing members substantially at right angles to the axis of rotation, connections between said sealing members and said journal and said box pipe, one of said connections being rigid to make the corresponding sealing member immovable in the direction of said axis of rotation and the other of said connections consisting of an elastic tubular connection adapted to make the corresponding sealing member adjustable in all directions, said cylinder being in direct and free communication with one side of said diaphragm to apply the steam pressure in said cylinder substantially without reduction on said sealing member adjustable in all directions to press it against said other sealing member, a slot in said adjustable sealing member, a guide member secured to said box pipe to engage said slot, and means secured to said journal to prevent any axial or radial stresses from said box pipe from being transmitted to said sealing members.

8. In a drying cylinder machine having hollow journals surrounding stationary box pipes for supplying steam to said cylinders, in combination for each rotary cylinder, a single pair of sealing rings, having one single pair of sealing surfaces engaging each other substantially at right angles to the axis of rotation, connections between one of said sealing rings and said journal and between the other sealing ring and said box pipe, one of said connections being rigid and the other consisting of an elastic steam-tight diaphragm adapted to permit the corresponding sealing ring to adjust itself to the movement of the sealing surface in all directions, said cylinder being in direct and free communication with one side of said diaphragm to apply the steam pressure in said cylinder substantially without reduction on said sealing member adjustable in all directions to press it against said other sealing member, a bearing secured to said journal and enclosing and directly engaging said box pipe to guide the same both axially and radially without tilting, and an oil casing secured to said journal and enclosing said sealing surfaces and said bearing.

9. In a drying cylinder machine, in combination for each rotary cylinder, a hollow journal on each cylinder, a bearing on said journal, a box pipe in said bearing, said bearing keeping said box pipe in a fixed position in relation to said journal both axially and radially, an external steam supply pipe connected with said box pipe, one single pair of sealing rings, having one single pair of plane sealing surfaces engaging each other substantially at right angles to the axis of rotation, connections between said sealing rings and said journal and said box pipe, one of said connections being rigid and the other consisting of an elastic steam-tight diaphragm adapted to permit the corresponding sealing ring to adjust itself to the movement of the sealing surface in all directions, the interior of said cylinder communicating freely with one side of said diaphragm to apply the steam pressure in said cylinder without substantial reduction on said sealing member adjustable in all directions to press the latter against said other sealing member with a pressure varying sensibly in dependence on said steam pressure, an oil casing secured to said rotary journal and enclosing said sealing surfaces, and oil channels through one of said sealing rings to said sealing surfaces.

10. In a drying cylinder machine, in combination, for each rotary cylinder, a hollow journal on each cylinder, a bearing rigidly secured to said journal, a stationary box pipe journalled directly in said bearing, said bearing keeping said box pipe in a fixed position in relation to said journal both axially and radially without tilting, one single pair of sealing rings, said sealing rings substantially at right angles to the axis of rotation having one single pair of annular sealing surfaces engaging each other, connections between said sealing rings and said journal and said box pipe, one of said connections being rigid to make the corresponding sealing ring immovable in the direction of said axis of rotation and the other of said connections consisting of an elastic steam-tight diaphragm adapted to make the corresponding sealing ring adjustable in all directions, the interior of said cylinder communicating freely and unrestrictedly with one side of said diaphragm to apply the full steam pressure in said cylinder on said sealing ring adjustable in all directions to press the latter against said other sealing ring with a pressure varying sensibly in dependence of said steam pressure, an oil casing secured to said journal and enclosing said sealing surfaces and said bearing, and at least one open channel through said casing to the atmosphere.

11. In a machine having rotary cylinders for drying a web running thereon, in combination for at least one cylinder, a hollow journal on said cylinder, a bearing secured to said journal, a sationary box pipe journalled in said bearing, two sealing rings having plane sealing surfaces substantially at right angles to the axis of rotation of said cylinder, a connection between one of said rings and said journal, another connection between the other of said rings and said box pipe, one of said connections being rigid and the other of said connections consisting of a steam-tight elastic diaphragm, means for supplying the steam pressure in said cylinder on one side of said diaphragm, an oil casing secured on said journal and enclosing said sealing surfaces, and scoops on the inner walls of said casing.

12. In a machine having rotary cylinders for drying a web running thereon, in combination for at least one cylinder, a hollow journal on said cylinder, a bearing secured to said journal, a stationary box pipe journalled in said bearing, two sealing rings having plane sealing surfaces substantially at right angles to the axis of rotation of said cylinder, a connection between one of said rings and said journal, another connection between the other of said rings and said box pipe, one of said connections being rigid and the other of said connections consisting of a steam-tight elastic diaphragm, means for applying the steam pressure in said cylinder on one side of said diaphragm, an oil casing secured on said journal and enclosing said sealing surfaces and said bearing, and spikes on the inner walls of said casing.

13. In a machine having rotary cylinders for drying a web running thereon, in combination for at least one cylinder, a hollow journal on said cylinder, a bearing secured to said journal, a stationary box pipe journalled in said bearing, two sealing rings having plane sealing surfaces substantially at right angles to the axis of rotation of said cylinder, a connection btween one of said rings and said journal, another connection between the other of said rings and said box pipe, one of said connections being rigid and the other of said connections consisting of a steam-tight elastic diaphragm, means for applying the steam pressure in said cylinder on one side of said diaphragm, an oil casing secured to said journal and enclosing said sealing surfaces and said bearing, and a scraper secured on said box pipe and extending to a point near the inner wall of said casing.

14. In a machine having rotary cylinders for a web running thereon, in combination for at least one cylinder, a hollow journal on said cylinder, a casing secured to said journal, at least one bearing secured in said casing, a stationary box pipe journalled in said bearing to be kept stationary both axially and radially thereby without tilting, an external steam supply pipe secured to said box pipe, one sealing ring, said ring and journal having one single pair of cooperating plane sealing surfaces substantially at right angles to the axis of rotation of said cylinder, and a steam-tight elastic diaphragm secured between said ring and said box pipe leaving an open, substantially unrestricted communication between said box pipe and one side of said diaphragm.

15. In a drying cylinder machine having hollow journals surrounding stationary box pipes for supplying steam to said cylinders, in combination, for each rotary cylinder, a bearing secured to said journal and directly engaging said box pipe to keep it stationary both axially and radially without tilting, one pair of sealing rings through which said box pipe passes, said rings having one pair of plane sealing surfaces engaging each other and being substantially at right angles to the axis of rotation of said cylinder, and connections between said sealing rings on one hand and said journal and said box pipe on the other hand, one of said connections being rigid and the other consisting of an elastic tubular joint adapted to permit the corresponding sealing ring to adjust itself to the movements of the sealing surface in all directions, said tubular connection communicating on one side directly via an open unrestricted passage with the interior of said cylinder.

16. In a machine having rotary cylinders for a web running thereon, in combination for at least one cylinder, a hollow journal on said cylinder, a stationary box pipe communicating with the interior of said cylinder, means secured to said journal and directly engaging said box pipe to keep it in a fixed position in relation to said journal both axially and radially without tilting, an external supply pipe to said box pipe, a rigid draining pipe rigidly secured to said box pipe and extending into the interior of said cylinder, a sealing ring, one single pair of cooperating plane sealing surfaces on said ring and on said journal substantially at right angles to the axis of rotation of said cylinder, and a fluid-tight elastic diaphragm secured between said ring and said box pipe leaving a substantially unrestricted communication between said box pipe and one side of said diaphragm.

17. In a machine having rotary cylinders for a web running thereon, in combination for at least one cylinder, a hollow journal on said cylinder, a stationary box pipe communicating with the interior of said journal, a bearing secured to said journal and engaging said box pipe to keep it in a fixed position in relation to said journal both axially and radially without tilting, an external supply pipe to said box pipe, a rigid draining pipe rigidly secured to said box pipe and extending into the interior of said cylinder, a sealing ring, one single pair of cooperating plane sealing surfaces on said ring and on said journal substantially at right angles to the axis of rotation of said cylinder, and a fluid-tight elastic diaphragm secured between said ring and said box pipe leaving a substantially unrestricted communication between said box pipe and one side of said diaphragm, said diaphragm being so shaped and arranged as to permit axial but only a slight radial motion of said sealing ring.

18. In a machine having rotary cylinders for a web running thereon, in combination for at least one cylinder, a journal extending from said cylinder, a stationary box pipe communicating with the interior of said journal, a bearing secured to said journal and directly engaging said box pipe to keep it permanently without tilting in a fixed position both radially and axially in relation to said journal, an external supply pipe to said box pipe, a rigid draining pipe rigidly secured to said box pipe and extending through said journal, a sealing ring, one single pair of engaging sealing surfaces substantially at right angles to the axis of rotation of said cylinder, one of said sealing surfaces being rigid with said journal and the other being ground on said sealing ring, and a fluid-tight elastic diaphragm secured at one end to said ring and at the other end to said box pipe but leaving a substantially unrestricted communication between said box pipe and one side of said diaphragm, said diaphragm being adapted to yield well in the axial direction but to exert a strong but elastic centering action in the radial direction on said sealing ring.

19. In a machine having rotary cylinders for drying purposes, in combination for at least one cylinder, a journal extending from said cylinder, a stationary box pipe communicating with the interior of said cylinder, a bearing directly engaging said box pipe to keep it without tilting in position both radially and axially in relation to said journal, an external pipe connection with said box pipe, a sealing ring, one single pair of engaging sealing surfaces substantially at right angles to the axis of rotation of said cylinder, one of said sealing surfaces being rigid with either of said journal and said external pipe and the other being ground on said sealing ring, and a fluid-tight elastic diaphragm secured at one end to said ring and at the other end to either of said box pipe and said journal, leaving a substantially unrestricted communication between said box pipe and one side of said diaphragm, said diaphragm being adapted to yield well in the axial direction but to exert a strong but elastic, centering action in the radial direction on said sealing ring.

CURT ROSENBLAD.